United States Patent [19]

Hertzel et al.

[11] Patent Number: 4,734,729
[45] Date of Patent: Mar. 29, 1988

[54] STUDDED SQUEEGEE ROLLER

[75] Inventors: Gerald T. Hertzel; Gerald F. Pickens; Matthew J. Visbaras, all of Rochester, N.Y.

[73] Assignee: Eastman Kodak Company, Rochester, N.Y.

[21] Appl. No.: 762,898

[22] Filed: Aug. 6, 1985

[51] Int. Cl.[4] .............................................. G03D 9/02
[52] U.S. Cl. ..................................... 354/304; 354/86; 29/121.1; 219/121 L; 219/121 LM; 118/DIG. 5
[58] Field of Search ........................... 354/86, 87, 304; 29/121.1, 121.2, 121.3, 121.4, 121.5, 121.6, 121.7, 121.8; 219/121 L, 121 LM, 121 LE, 121 LL, 121 LK, 121 LF; 118/DIG. 15

[56] References Cited

U.S. PATENT DOCUMENTS

| | | |
|---|---|---|
| 444,597 | 1/1891 | Lichtenstadt et al. . |
| 1,730,520 | 10/1929 | McMurray ......................... 29/121.2 |
| 1,938,444 | 12/1933 | Vedder .............................. 29/121.2 |
| 2,023,019 | 12/1935 | Heppes ........................ 118/DIG. 15 |
| 2,131,777 | 10/1938 | Willcox ............................ 29/121.2 |
| 2,577,129 | 12/1951 | Johnston et al. . |
| 2,638,050 | 5/1953 | King ............................ 118/DIG. 15 |
| 2,724,493 | 11/1955 | Jones . |
| 3,177,558 | 4/1965 | Gronholz . |
| 3,261,288 | 7/1966 | Dickerson .................. 118/DIG. 15 |
| 3,303,319 | 2/1967 | Steigerwald . |
| 3,339,818 | 9/1967 | Morrow ............................ 29/121.2 |
| 3,419,321 | 12/1968 | Barber et al. . |
| 3,447,221 | 6/1969 | Odiorne . |
| 3,586,816 | 6/1971 | Hagen . |
| 3,626,143 | 12/1971 | Fry . |
| 3,790,744 | 2/1974 | Bowen . |
| 3,878,353 | 4/1975 | Anderson . |
| 3,955,260 | 5/1976 | Sherden ...................... 118/DIG. 15 |
| 4,028,523 | 6/1977 | Anderl et al. . |
| 4,110,152 | 8/1978 | Dunning et al. ................. 29/121.2 |
| 4,131,782 | 12/1978 | Einstein et al. . |
| 4,147,425 | 4/1979 | Friedman et al. . |
| 4,200,382 | 4/1980 | Friedman . |
| 4,319,827 | 3/1982 | Carter et al. . |
| 4,323,401 | 4/1982 | Belke et al. . |
| 4,460,255 | 7/1984 | Kozai et al. . |

FOREIGN PATENT DOCUMENTS

| | | |
|---|---|---|
| 962337 | 2/1975 | Canada . |
| 2029308A | 3/1980 | United Kingdom . |
| 2040824A | 9/1980 | United Kingdom . |

OTHER PUBLICATIONS

A. A. Antonov et al., entitled "A Steady-State Crater formed as a Result of Interaction of High-Power cw $CO_2$ Laser Radiation with Metals and Liquids, Soviet Journal Quantum Electronics 7(8), Aug. 1977, pp. 990-993.

Primary Examiner—A. A. Mathews
Attorney, Agent, or Firm—Norman Rushefsky

[57] ABSTRACT

An improved squeegee roller particularly suited for use in an instant camera has a texture formed by stud-like bumps. A complex contour is provided to the roller by varying the heights of the bumps along the roller surface. In a method and apparatus for producing the roller a pulsed laser beam is used to produce the bumps and the energy of each pulse is varied according to a predetermined program to adjust the height of a bump formed.

22 Claims, 8 Drawing Figures

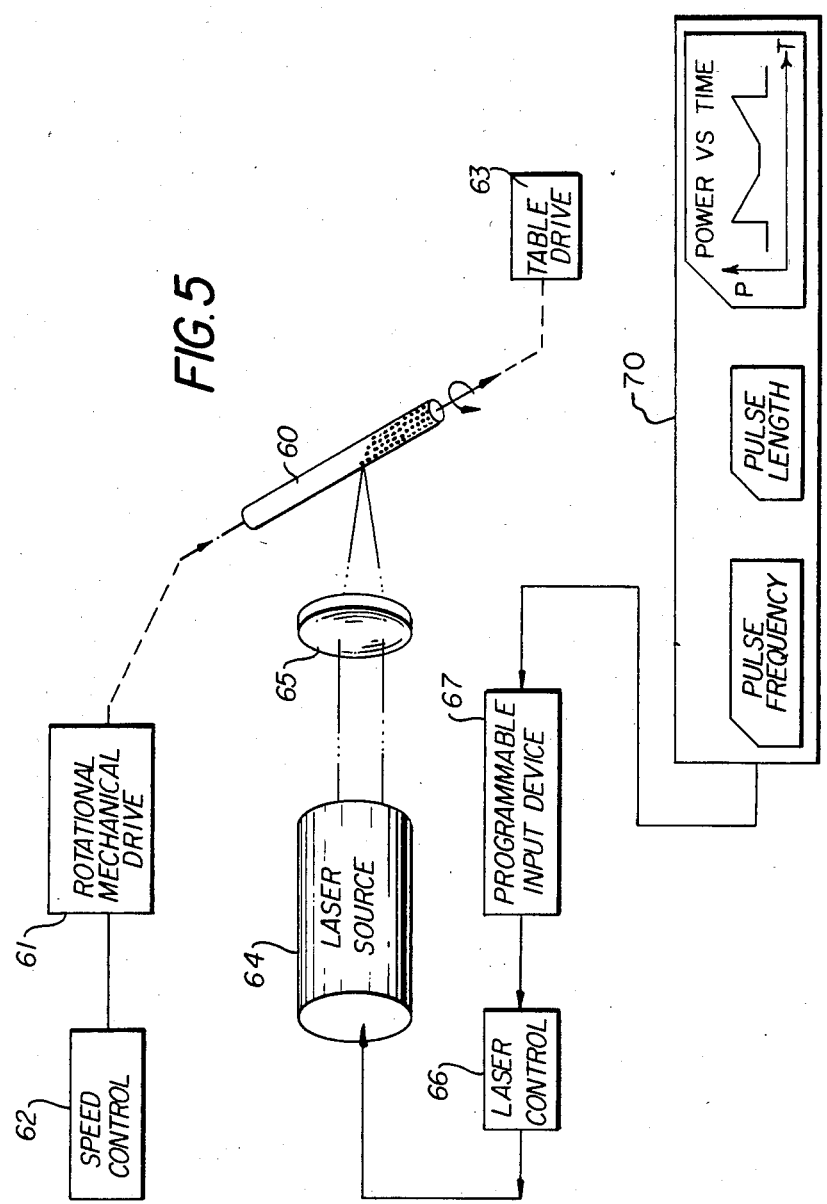

STUDDED SQUEEGEE ROLLER

BACKGROUND OF THE INVENTION

1. Field of the Invention

The invention, in general, relates to a squeegee roller. The squeegee roller has application in apparatus for spreading a fluid between layers of adjacent sheets of, for example, a photographic element or elements.

2. Description of the Prior Art

Squeegee rollers for use in photographic apparatus, such as instant cameras, are well known. The EK-6 Instant Camera, for example, manufactured by the Eastman Kodak Company, Rochester, N.Y., is adapted to expose and initiate processing of so-called instant film units of the integral type. These film units each include a pod containing processing fluid. The pod is adapted to be ruptured, subsequent to a photographic exposure, upon introduction of the film unit into the squeegee rollers. As the film unit is driven through the nip of the squeegee rollers, the processing fluid is distributed within the film unit as a layer over image-forming areas of the film unit to initiate the processing of the photographic image. In order to distribute a uniform layer of the fluid processing composition within the film unit, it is well known to provide the rollers with various contours other than that of a right-regular cylinder. For example, in U.S. Pat. No. 4,319,827, there is shown an instant camera wherein one of the squeegee rollers is contoured with a crown configuration. To manufacture this roller according to the aforementioned patent, it is first necessary to machine a stainless steel roller to the crown shape. Thereafter, the roller is roughened or textured to increase its frictional characteristics by subjecting the roller to an electrical discharge machining (EDM) operation. This latter operation forms minute craters in the surface of the roller. In the process of forming these craters, the surface of the roller is subjected to bombardment by very high energy ions which cause surface and subsurface material on the roller to be displaced into an annular ridge that circumscribes each crater. This patent also teaches that the roughened surface of the roller can be adjusted so as to effect minor changes in fluid thickness control. In the EDM process, the operation contemplates the use of rapid pulsing of the EDM source while the roller is rotated and the source moved axially relative to the roller. The pulsing of the source for the treating of any one roller contemplates the use of a specific pulse on time period and employs a specific pulse current during such period. Minor differences in spread characteristics of one roller pair relative to another roller pair may be provided by treating the one roller pair such that they are subjected to a higher or lower pulse on time or alternatively a higher or lower pulse current.

One disadvantage with this method of manufacture is the extra expense required to machine rollers to form a crown or other complex contour prior to texturing the roller. It is therefore one object of the invention to provide an improved squeegee roller that includes an effective complex contour. It is a further object of the invention to provide an improved method and apparatus for manufacturing a textured squeegee roller having an effective complex contour without the need for machining the roller with a complex contour prior to the step of adding a texture to the surface thereof.

SUMMARY OF THE INVENION

The invention relates to an improved squeegee roller particularly suited for use in an apparatus for spreading a fluid between adjacent sheets or layers. The roller comprises a circumferential surface upon which is formed a texture comprising stud-like bumps.

BRIEF DESCRIPTION OF THE DRAWINGS

In the detailed description of the preferred embodiments of the invention presented below reference is made to the accompanying drawings wherein like reference numerals denote like elements and wherein:

FIG. 5 is a diagrammatic perspective view of apparatus of the invention.

DESCRIPTION OF THE PREFERRED EMBODIMENT

Because photographic apparatus such as cameras are well known, the present invention will be directed in particular to elements forming part of, or cooperating more directly with the present invention, camera elements not specifically shown or described herein being understood to be selectable from those known in the art.

Figure 1:
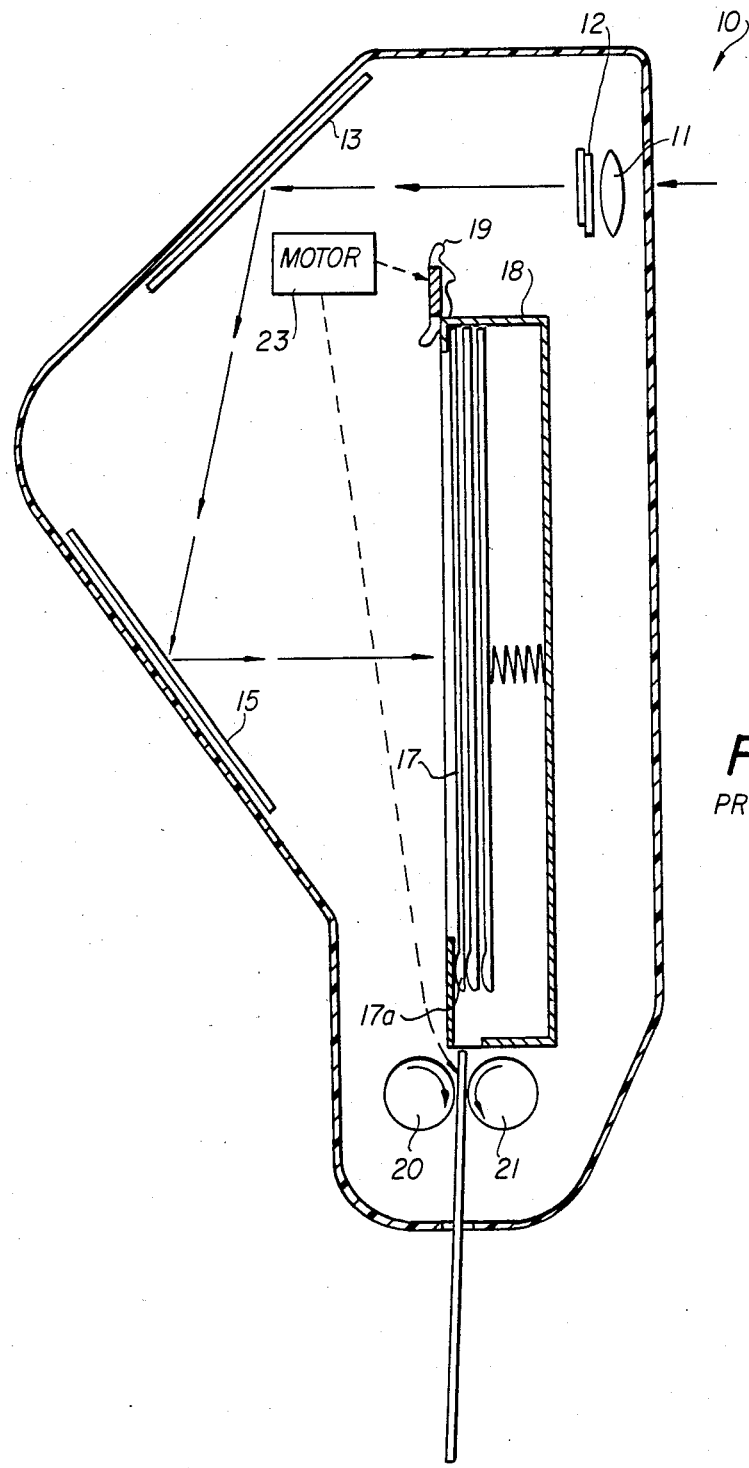
FIG. 1 is a diagrammatic elevational view of a prior art automatic self-processing camera in which the squeegee rollers of the present invention may be used.
Figure 2:
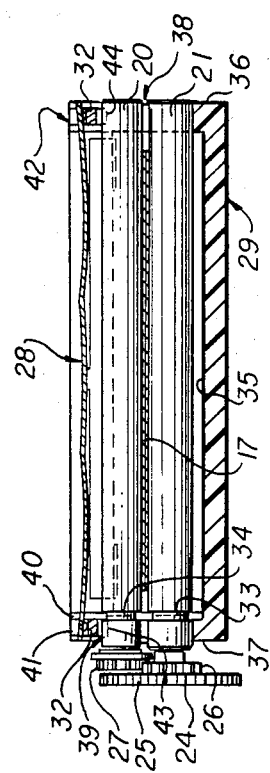
FIG. 2 is an elevational view of a squeegee roller assembly used in the camera of FIG. 1.

Referring now to the drawings and in particular to FIGS. 1 and 2 there is shown an instant camera 10 of the prior art described above and which includes a lens 11, a conventional exposure control element including a shutter 12, first and second mirrors 13 and 15 respectively, for increasing the effective focal length of the camera and directing the image onto an instant film unit 17 stored with other similar film units in a cartridge 18. The camera's shutter release button (not shown) may be mechanically or otherwise coupled to the shutter by suitable conventional means and upon depression of the former, the shutter is opened to admit an appropriate amount of light to properly expose the film unit. As is known in conventional instant cameras, after exposure of the film unit, a picker device 19 is actuated to transport the film unit into the nip of a pair of driven squeegee rollers, 20, 21 which remove the film unit 17 from the camera 10 and while doing so maintain a flow of processing fluid across the image area of the film unit to thereby process same. To drive the squeegee rollers, the camera includes a motor 23 and suitable gearing, including gears 24–27 shown (see FIG. 2) which transmit drive from the motor to the pressure rollers 20, 21. The motor 23 may in turn receive its energy from a battery, not shown.

The instant film unit 17 is a multi-layered construction incorporating a rupturable pod 17a containing processing fluid. The rollers are resiliently urged toward each other by means of a spring 28 to apply pressure on the film unit. Once the exposed film unit is in the nip formed by the rollers, rotation of one or preferably both of the rollers continues the movement of the film unit between the rollers thereby rupturing the pod and spreading the developing fluid between the layers or adjacent sheets of the film unit. The rollers are textured or roughened to enhance their frictional engagement with the film unit.

As shown in FIG. 2 the squeegee roller assembly includes a frame 29, a pair of rollers 20 and 21, a pair of bearing blocks 32, a bow-shaped leaf spring 28, and gears 24-27.

Prior art rollers 20 and 21 are substantially identical, each having an annular groove 33, 34 respectively near one end. The frame 29 that holds the rollers in juxtaposed relationship has a base portion 35 slightly shorter than the length of the rollers 20 and 21 and two end portions 36 and 37 perpendicular to the base portion having U-shaped slots 38-39 respectively therein for rotatably receiving the ends of the rollers. A rib 40 on the inside edge of one of the slots engages the annular grooves 33, 34 of the rollers to prevent longitudinal motion of the rollers in the frame. When rotatably mounted in the frame, the rollers are free to undergo radial displacement from one another.

Bearing blocks 32 are received in recesses 41 and 42 in the frame and cover the open ends of the U-shaped slots 38 and 39. The bearing blocks each have a concave cylindrical surface that is complementary to the cylindrical surface of the roller 20 and is adapted to be engaged by pressure roller 20. The bearing blocks rest on the bottom surfaces 43, 44 of recesses 41 and 42 respectively and are out of contact with roller 30 when there is no film unit between the rollers.

Further details regarding the construction of the roller assembly may be found in U.S. Pat. No. 3,983,567 filed in the name of Kindig et al.

Figure 3:
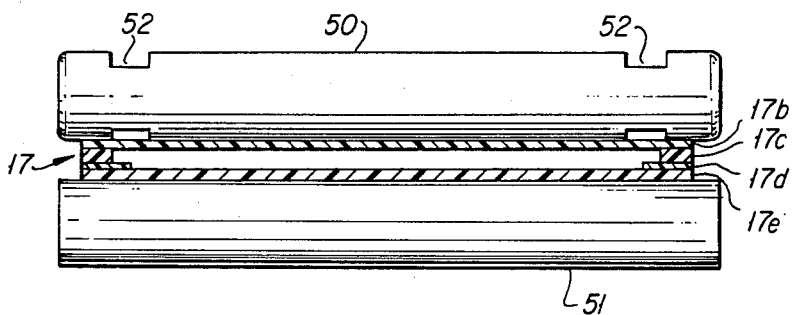
FIG. 3 is a diagrammatic elevational view of a pair of squeegee rollers one of which has a complex contour made in accordance with the teachings of the invention.

With reference now to FIG. 3 a portion of the working or squeegeeing areas of a squeegee roller assembly suitable for use in the camera of FIG. 1 is shown operating on a film unit. One of the rollers 50 includes a circumferential surface that has a complex contour on the area used for working or squeegeeing the film unit and the other 51 has the shape of a right-regular cylinder. It should be appreciated, however, that the contour, dimensions and illustration of the film shown are exaggerated to facilitate understanding of the invention. The film unit 17 such as KODAK Instant Color film PR 144-10 manufactured by Eastman Kodak Company, Rochester, N.Y. is of a multi-layered sandwich construction and includes a cover sheet 17b, side rails 17c, mask 17d and integral image receiving sheet 17e. The complex contour for the squeegeeing portion of roller 50 is shown provided with smaller diametral sections 52 forming circumferential notches in areas immediately opposite the masked areas of the side portions of the film unit. The notch which would only be several tenthousandths of an inch in depth allows additional amounts of processing fluid to flow along the side portions of the film and thereby improves upon processing fluid distribution.

Figure 4:
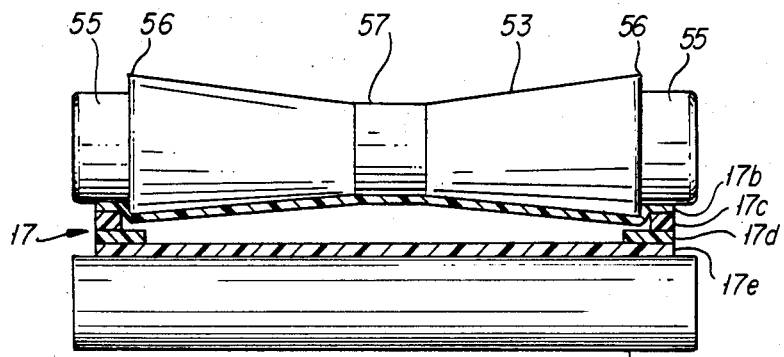
FIG. 4 is a similar view to that of FIG. 3 but illustrates a squeegee roller having a different complex contour than that shown in FIG. 3.

With reference now to FIG. 4, one squeegee roller 53 shown with a complex contour on its working or squeegeeing area (again shown exaggerated) includes smaller diametral sections which ride over the side portions of the film unit 17. Just inward of this is an enlarged diametral section 56 which is opposite the masked area of the film unit 17. Noting progressive diametral sections of the roller inboard of the sides of the film unit it may be seen that these sections taper or become smaller in diameter until the diametral section 57 overlying the center of the film unit is reached. Thus two tapers are formed in the effective diameters of the roller; the tapers providing larger diametral sections adjacent to the sides of the photographic film unit and smaller diametral sections adjacent to the center of the photographic film unit. The other squeegee roller 54 cooperating with roller 53 has a working surface in the form of a right-regular cylinder.

A description of a squeegee roller having a narrow central portion may be found in U.S. Pat. No. 4,460,255 filed in the name of Kozai et al. A roller having the configuration illustrated in FIG. 4 may be useful in a camera described in this patent for providing enhanced distribution of processing fluid.

Figure 6:
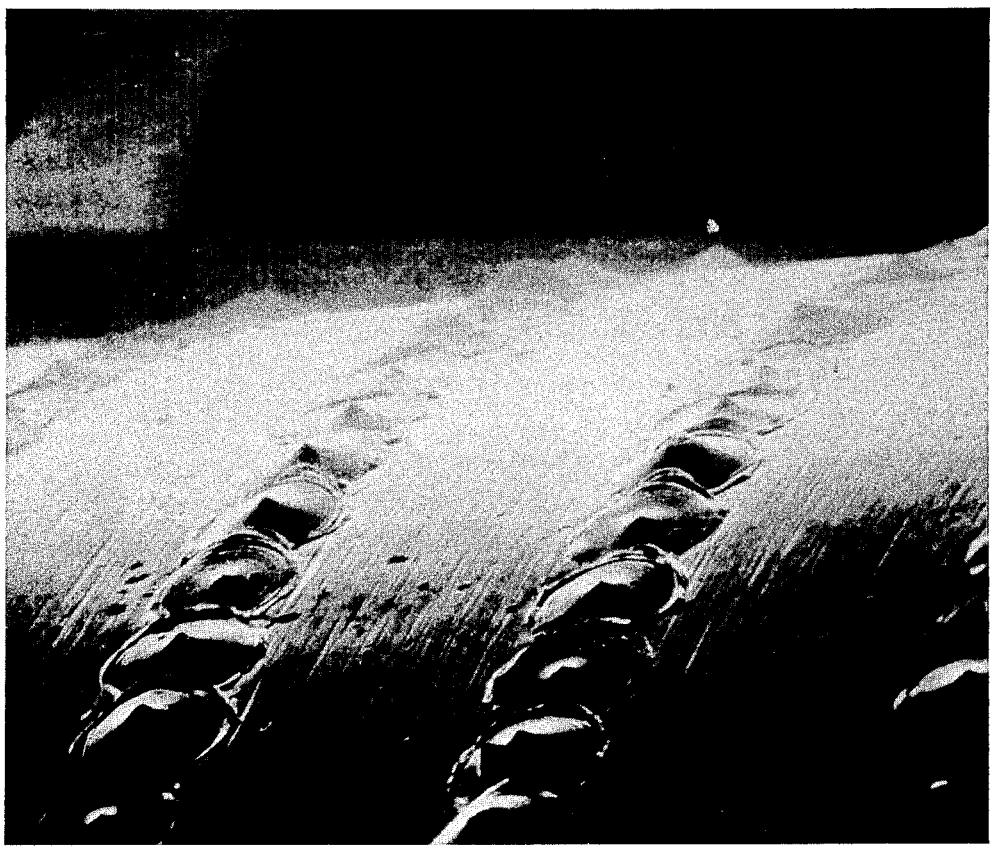
FIG. 6 is a photograph of the surface of a squeegee roller of the invention at 75 magnification.

With reference now to FIG. 6 a magnified view of a small portion of the surface of a squeegee roller is shown. The surface thereof includes a texture comprised of an orderly arrangement of stud-like bumps which project out from the surface and provide for effective gripping of a film unit when the film unit is engaged between a roller having these features and another roller with a texture formed by a sand blasting techniques of the prior art. In addition to providing frictional engagement with the film unit the bumps such as shown in FIG. 6 may have their heights varied at appropriate diametral sections to form a roller with a complex contour such as shown in the examples illustrated in FIGS. 3 or 4.

Figure 8:
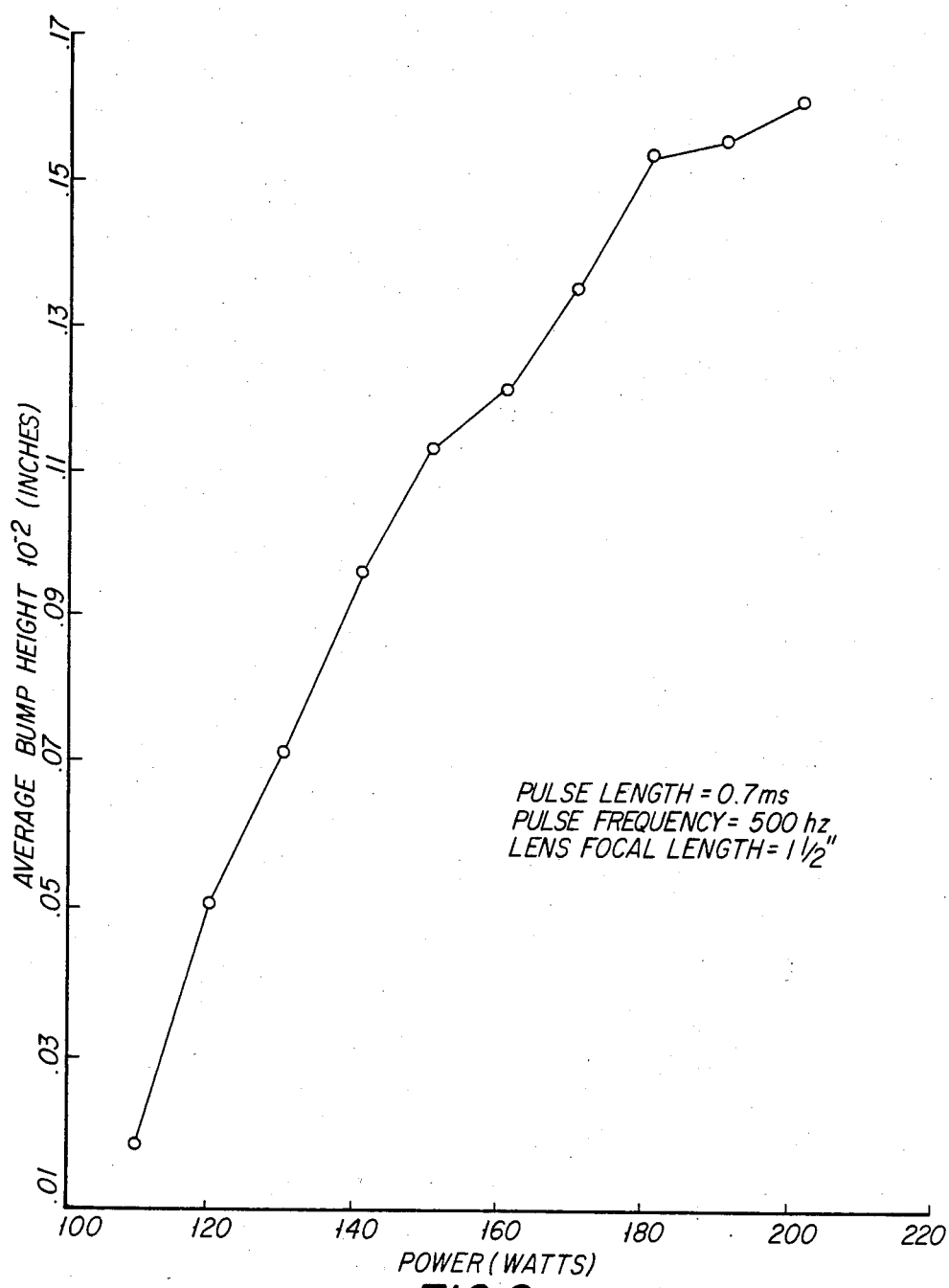
FIG. 8 is a hypothetical graph illustrating a relationship between parameters used in producing rollers of the invention.

The method and apparatus for forming squeegee rollers with a complex contour will now be discussed with regard to FIG. 5. A roller 60 to be textured in accordance with the invention is first machined by conventional means so that the surface used for spread control or squeegeeing portion is in the form of a right-regular cylinder of nominal diameter, for example, 0.375 inches (9.5 mm). Of course, other non-squeegeeing portions of the roller such as groove 34 (see FIG. 2) are preformed prior to the texturing operation. A preformed roller 60 is then mounted in a rotational mechanical driving device such as a lathe 61 whose rotational speed is controlled by a conventional speed control device 62. The lathe, in turn, is mounted on a translatable table (not shown) having a conventional programmable table drive 63 so that the roller can be simultaneously rotated about its longitudinal axis and translated at a controlled speed in the direction of its axis relative to a stationary laser source such as a 185 watt $CO_2$ pulsed laser source 64 which emits radiation in the far infrared of approximately 10.6 $\mu$ wavelength. A zinc-selenide lens 65 focuses the beam onto the surface of the roller. Suitable conventional mask means may be used to prevent splattering material form reaching the lens. Air jets may be used to clear the immediate area of the roller being subjected to the beam to remove vaporized metal which might otherwise cause splattering. To reduce the possibility of splattering of material from adhering and creating unwanted bumps on the roller, the roller surface may be covered with a thin layer of a dried organic ink material such as that used in black felt tip marker pens sold under the trademark Magic Marker. Conventional controls 66 associated with the laser may be adjusted to provide a pulse length of 0.7 ms. and a pulse frequency of 500 Hz. The roller may be made to rotate at 197 rpm and the table speed adjusted to 0.06 in/sec (1.5 mm/sec) to provide a helix pitch of 0.018 inches (0.46 mm) between the rows of raised bumps shown in FIG. 6. A programmable input device 67 such as a programmable timer is coupled to the laser control 66 to adjust the power of the laser beam in accordance with the instantaneous bump height desired. To form a roller having a complex contour a programmable device may also be provided with a computerized control into which inputs such as desired pulse frequency, pulse length and the relationship of pulse power vs. time may be programmed either through appropriate inputs or in a production mode stored in the computer's read only memory. Outputs from the programmable device 67 are fed to the laser control and are used by the laser control to provide the desired beam parameters. With reference also to FIG. 8 it may be noted that a predetermined relationship exists between the various beam parameters and the particular type of roller used that will allow for average bump height to be varied with regard to beam power. For the roller 53 shown in FIG. 4 bump heights averaging 0.0004 inches (0.01 mm) may be used for the smallest diametral sections 55 and bump heights of 0.0015 inches (0.0381 mm) for the largest diametral sections 56. Although not every bump produced will be of the same height when the identical respective parameters are used, the bumps will tend to have heights which distribute about an average height which is proximate to that which has been predetermined through experiments using rollers of the same material composition. For any one rotation of the roller there are many bumps produced using the same power level and thus the bump heights along a diametral section tend to approach this predetermined average. As may be noted in the sketch of FIG. 5 the program for power vs time to produce the roller 53 of FIG. 4 is sketched. The beam power would be at a relatively low level to produce the smaller diametral sections 55 formed at the ends of the squeegeeing portion of the roller 53. The beam power is highest at the diametral sections 56 of the roller that will be opposite the mask layer of the film unit and diminishes (in accordance with a linear or curved function) as the center of the roller is approached by the beam. As may be noted in FIG. 8 stud-like bump heights of between about 0.0002 inches (0.005 mm) and 0.0015 inches (0.0381 mm) may be produced by varying the beam power level.

In order to produce the roller 50 having the complex contour shown in FIG. 3, a beam power that is suitable for forming the desired diametral section diameter for the larger dimension is used and then switched to a smaller beam power for producing the smaller or "notched" diametral sections 52. Alternatively, the beam power for these "notched" sections may be turned off so that no texture is produced at these points. In a design where no texture is to be produced at the notched sections this portion of the roller may be used for location of the bearing blocks 32 upon which the spring 28 resiliently urges the rollers together when a film unit is between them. Placement of the bearing blocks at this location will permit for some narrowing of the camera.

Figure 7:
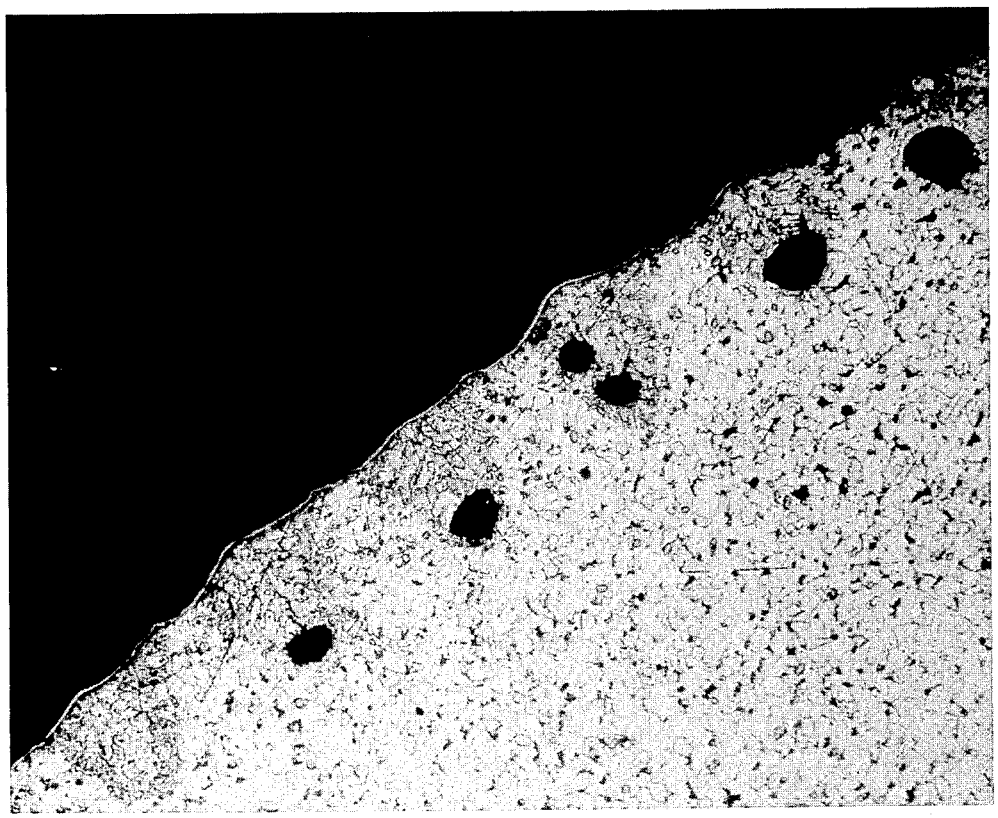
FIG. 7 is a photograph of a section of a squeegee roller of the invention showing portions immediately beneath the surface at 100 magnification.

Rollers made in accordance with the invention were sectioned and as shown in the FIG. 7 were found to have subsurface voids located beneath the bumps. In addition a chemical analysis of the bumps revealed a relatively high concentration of sulfur and manganese which are some of the lower vapor point elements included within the respective steel rollers used. It was further noted that these bumps did not appear on rollers which had no or low amounts of these elements. It is believed that as a laser beam strikes the roller the outer surface melts and sulfur and manganese from beneath the surface vaporize. After the beam has turned off and when the surface has cooled somewhat and solidified, the still vaporized sulfur and manganese generates sufficient pressure to form the surface bump. The material present in the bump is complemented by a subsurface void formed at the base of or beneath the bump.

Examples of suitable roller materials found to produce the bumps described herein were rollers manufactured from Carpenter AISI 182 FM stainless steel and AISI carbon steel grades 1213 or 1215. Carbon steel rollers subsequent to texturing as described herein may be covered with a thin nickel plating as known in the prior art. Although the preferred embodiments have been described with regard to texturing with stud-like bumps of only the complex contoured roller of a roller pair, the right-regular cylindrical rollers 51, 54 may also be textured with these bumps as well and preferably these bumps will have a uniform height. In such case the effective diameter of this roller will change and it would be desirable to reduce the effective diameters of their cooperating rollers 50, 53 respectively.

The invention has been described in detail with particular reference to preferred embodiments thereof, but it will be understood that variations and modifications can be effected within the spirit and scope of the invention.

We claim:

1. For use in an apparatus for spreading a fluid composition between adjacent sheets or layers, a squeegee roller which includes a circumferential surface upon which is formed a texture; a plurality of discrete substantially incompressible stud-like bumps on the roller to provide the texture and subsurface voids located beneath the bumps; and wherein the average height of bumps located upon one diametral section of the roller surface is substantially different from the average height of bumps located upon another diametral section of the roller surface so as to provide different effective roller diameters for such sections, and further wherein the average bump heights of the diametral sections gradually decrease to form a taper in the effective diameters of the roller.

2. The roller of claim 1 wherein the stud-like bumps have a height from the surface of between about 0.0004 inches and 0.0015 inches.

3. The roller of claim 1 and further wherein the roller is formed of steel and the bumps formed thereon are projections of steel forced upwardly from the surface of the steel roller.

4. The roller of claim 3 and wherein the steel is selected from the group consisting of Carpenter AISI 182 FM stainless steel, AISI carbon steel grade 1213 and AISI carbon steel grade 1215.

5. The roller of claim 3 and wherein the stud-like bumps are orderly arranged upon the surface of the roller.

6. The roller of claim 3 and wherein the bumps have a height from the surface of between about 0.0004 inches and 0.0015 inches.

7. In combination a pair of squeegee rollers, resilient means urging the rollers together for spreading a fluid between adjacent sheets or layers, at least one of the rollers including a circumferential surface upon which is formed a texture for increasing the frictional characteristic of the surface, and the improvement wherein the texture comprises a plurality of discrete stud-like bumps, the average height of bumps located upon one diametral section of the roller surface is different from the average height of bumps located upon another diametral section of the roller surface so as to provide different effective roller diameters for such sections, and wherein the average bump heights of the diametral sections gradually decrease to form a taper in the effective diameters of the roller.

8. The combination of claim 7 wherein the stud-like bumps have a height from the surface of between about 0.0004 inches and 0.0015 inches.

9. The combination of claim 7 wherein the stud-like bumps are on both rollers and have a height from the surface of between 0.0002 inches and 0.0015 inches.

10. The combination of claim 7 and wherein at least one roller includes subsurface voids located beneath the bumps.

11. In a squeegee roller for spreading a fluid between adjacent sheets or layers, the roller including a right cylindrical surface upon which is formed a texture comprised of stud-like bumps, the improvement which comprises:
wherein the average height of bumps located upon one diametral section of the roller surface is different from the average height of bumps located upon another diametral section of the roller surface so as to provide different effective roller diameters for such sections, and further wherein the average bump heights of the diametral sections gradually decrease to form a taper in the effective diameters of the roller.

12. The roller of claim 11 and wherein the bumps comprise stud-like bumps whose height upon the surface is between 0.0002 inches and 0.0015 inches.

13. The roller of claim 11 and including subsurface voids located beneath the bumps.

14. In a photographic processing apparatus for spreading a fluid processing composition between layers or adjacent sheets of a photographic element or elements, squeegee means including a pair of juxtaposed surfaces one of which being a roller having a circumferential surface and cooperating with the other surface to form therebetween a nip through which the photographic element or elements is passed for spreading the fluid processing composition, the improvement comprising:
a plurality of orderly arranged incompressible stud-like bumps formed on the roller, the bumps comprising a texture means upon the surface to give same a roughened quality and also their average heights changing the effective diameter of the roller to an extent as to affect the fluid spreading performance of the roller.

15. The apparatus of claim 14 and wherein the height of the bumps upon the surfaces is between about 0.0002 inches and 0.0015 inches.

16. The apparatus of claim 14 and wherein the roller includes subsurface voids located beneath the bumps.

17. In a photographic processing apparatus for spreading a fluid processing composition between layers or adjacent sheets of a photographic element or elements, squeegee means including a pair of juxtaposed rollers between which there is formed a nip for spreading the fluid processing composition, one of the rollers comprising a right cylindrical surface upon which is formed a bumpy texture means, and the improvement which comprises:
wherein the average height of bumps located upon one diametral section of the roller surface is different from the average height of bumps located upon another diametral section of the roller surface so as to provide different effective roller diameters for such sections, and further wherein the average bump heights of the diametral sections gradually decrease to form a taper in the effective diameters of the roller to an extent so as to affect the fluid spreading performance of the roller.

18. The apparatus of claim 17 and wherein the texture comprises a plurality of discrete minute stud-like bumps.

19. The apparatus of claim 18 and wherein the roller includes subsurface voids located beneath the bumps.

20. The apparatus of claim 19 and wherein the roller is comprised substantially of steel and the stud-like bumps are also of steel and have a height of between 0.0002 inches and 0.0015 inches.

21. The apparatus of claim 17, 18, 19 or 20 and wherein the average bump heights of the diametral sections of the roller are varied to form two tapers in the effective diameters of the roller, the tapers providing larger diametral sections adjacent the sides of the photographic element or elements and smaller diametral sections adjacent the center of the photographic element or elements.

22. The apparatus of claims 14 or 17 and wherein the apparatus comprises a camera.

* * * * *